APPARATUS AND METHOD FOR FRACTIONATION OF GAS

Original Filed June 12, 1951 6 Sheets-Sheet 1

INVENTOR
CLARENCE J. SCHILLING

BY Shanley & O'Neil
ATTORNEY

June 19, 1962 C. J. SCHILLING Re. 25,185

APPARATUS AND METHOD FOR FRACTIONATION OF GAS

Original Filed June 12, 1951

6 Sheets-Sheet 2

INVENTOR
CLARENCE J. SCHILLING

BY Shanley & O'Neil

ATTORNEY

June 19, 1962 C. J. SCHILLING Re. 25,185

APPARATUS AND METHOD FOR FRACTIONATION OF GAS

Original Filed June 12, 1951 6 Sheets-Sheet 3

INVENTOR
CLARENCE J. SCHILLING

BY Shanley & O'Neil

ATTORNEY

APPARATUS AND METHOD FOR FRACTIONATION OF GAS

Original Filed June 12, 1951 6 Sheets-Sheet 4

INVENTOR
CLARENCE J. SCHILLING

BY Shanley & O'Neil

ATTORNEY

APPARATUS AND METHOD FOR FRACTIONATION OF GAS

Original Filed June 12, 1951 6 Sheets-Sheet 5

INVENTOR
CLARENCE J. SCHILLING
BY Stanley & O'Neil
ATTORNEY

APPARATUS AND METHOD FOR FRACTIONATION OF GAS

Original Filed June 12, 1951 6 Sheets-Sheet 6

INVENTOR
CLARENCE J. SCHILLING

BY Shanley & O'Neil

ATTORNEYS

United States Patent Office

Re. 25,185
Reissued June 19, 1962

25,185

APPARATUS AND METHOD FOR FRACTIONATION OF GAS

Clarence J. Schilling, Allentown, Pa., assignor, by mesne assignments, to Air Products and Chemicals, Inc., Trexlertown, Pa., a corporation of Delaware Original No. 2,932,174, dated Apr. 12, 1960, Ser. No. 660,023, May 13, 1957, which is a continuation of Ser. No. 561,209, Jan. 25, 1956, which in turn is a division of Ser. No. 450,927, Aug. 19, 1954, now Patent No. 2,836,040, dated May 27, 1958, the latter being a continuation of Ser. No. 231,221, June 12, 1951. Application for reissue Dec. 13, 1960, Ser. No. 75,644
10 Claims. (Cl. 62—13)

Matter enclosed in heavy brackets [ ] appears in the original patent but forms no part of this reissue specification; matter printed in italics indicates the additions made by reissue.

The present invention relates to an improved method and apparatus for separating air into its components by low temperature fractionation employing heat exchange between air to be fractionated and the cold products of the fractionation.

The use of large quantities of gaseous oxygen in connection with blast furnace and steel plant operation, in the synthesis of liquid fuel from gaseous hydrocarbons and other manufacturing operations is becoming of increasing importance. Such uses require large tonnages of gaseous oxygen at a relatively low cost. In the production of gaseous oxygen, which may be either pure or impure, air is first compressed to an elevated pressure and then cooled by heat exchange with backwardly returning cold component gases. The cold compressed air is separated by liquefaction and rectification into low pressure cold gaseous oxygen and nitrogen components, which are returned backwardly and warmed by heat exchange with countercurrently flowing compressed air. Argon may be additionally separated where desirable. The cycle is continuous and the heat exchange between the incoming compressed air and the countercurrently flowing gaseous components may be effected in tubular heat exchanger means or in indirect heat exchange means, sometimes termed accumulators. An accumulator includes a chamber filled with heat absorbing material. A cold component gas is flowed through the chamber to cool the heat absorbing material in the chamber. The flow of cold gas is interrupted and then air is flowed in the opposite direction through the chamber and cooled. The accumulators are operated in pairs for each component gas, the flow of air and cold component gas through each pair of accumulators being periodically reversed. There may, of course, be more than one pair of accumulators for each component gas. It will be thus apparent that the heat exchange between the compressed air and the countercurrently flowing component gas is effected indirectly.

With tubular heat exchangers, the compressed air is flowed along a path or passage through the heat exchanger in heat exchange relationship with one or more cold component gases flowing along a separate path or passage, the heat exchange being effected through walls of the passages between the stream of air and at least one countercurrently flowing stream of component gas. The passages need not have any particular cross-sectional shape, the term "tubular" being used as a convenient term for all forms in which heat is transferred through walls of passages. In switching heat exchangers, the path of the compressed air stream and path of a cold component gas are alternated. All of these methods and apparatus for effecting heat exchange between air and one or more backwardly returning gaseous components are broadly referred to herein as heat interchange or heat exchange effecting relationship in the case of the methods, and heat interchangers or heat exchange effecting means in the case of the apparatus.

As used herein, the terms 'oxygen component" and "nitrogen component" include pure oxygen or nitrogen, respectively, and oxygen and nitrogen-rich fractions of air, respectively. The purity of the component gas will depend, to a certain extent, upon its intended use. Other gaseous components of air, such as argon, may also be recovered separately in known manner without interfering with the functioning and principles of the present invention.

Air contains constituents boiling at a higher temperature than oxygen, for example, water and carbon dioxide. When air is cooled by heat interchange with one or more countercurrently flowing gaseous components, these higher boiling constituents are deposited in zones along the path of flow of the air. The removal of these constituents from the air prior to cooling is relatively expensive and it is more economical to permit these constituents to be deposited in the accumulator or the switching type exchanger and thereafter remove the deposited constituents by the countercurrently flowing component gas. In other words, the countercurrently flowing component gas sweeps out the higher boiling constituents. Carbon dioxide is particularly difficult to remove and there is a tendency for the carbon dioxide to build up and clog the passage or passages. This removal of deposited constituents is broadly referred to as "deriming." Deriming difficulties arise from the relatively large temperature difference existing between the countercurrently flowing streams in the region of the deposits.

The carbon dioxide is deposited in the zone in which the air is cooled to the solidification temperature of carbon dioxide gas. When the component gas, usually but not necessarily, nitrogen component gas, is flowed through the passage in the opposite direction, the nitrogen stream flowing through the zone of deposit of carbon dioxide has a lower temperature than the air stream had when it flowed through this zone. As a result, the component gas, despite its lower pressure, does not remove all of the carbon dioxide. Accordingly, various complicated methods have been proposed for reducing the temperature difference between the countercurrently flowing streams of air and component gas by increasing the effective mass of cooling component gas to air in deriming and preventing clogging of the passages.

When operating an oxygen plant including a plurality of switching exchangers or accumulators, it may be necessary or desirable as for the purpose of deriming or other reasons to operate the heat interchangers so that the temperature difference between the air stream and the cooling gas is less in part of the heat interchange paths than in other parts of heat interchange paths. Where the total range of cooling is the same, the length of the interchanger varies inversely as the temperature difference. Thus, the heat interchange path for part of the air may be much longer, for example twice as long as the heat interchange path for cooling another portion of the air. This is undesirable as it greatly increases the total cost of the heat interchanger system.

It is an object of the present invention to provide an improved method and apparatus for the manufacture of oxygen in which the operating cycle is of extreme simplicity.

Another object of the present invention is to provide an improved method and apparatus for the manufacture of oxygen that provides for continuously cleaning those passages which tend to become filled with materials solidified from the air.

Another object of the present invention is to provide an improved cycle for the manufacture of oxygen which furnishes simultaneous compensation for refrigeration losses and deriming of the heat interchanger means.

Another object of the present invention is to provide an improved cycle for the manufacture of oxygen by plural stage fractionation which utilizes nitrogen from the high pressure stage for the dual purpose of compensating for refrigeration losses and aiding in balancing the heat requirements of an interchanger in which the air supply is refrigerated with returning cold gaseous component.

Another object of the present invention is to provide an improved cycle for the manufacture of oxygen which utilizes heat interchangers to freeze impurities out of a portion of the feed air and chemical clean-up to remove impurities from the remainder of the air, with simultaneous compensation for refrigeration losses and balancing of the heat interchange system.

Another object of the present invention is to provide an improved method and apparatus for the manufacture of oxygen that provides for adjusting the temperature difference between a stream air and a countercurrently flowing stream of component gas so that the over-all length of the heat interchange paths may be optimum.

In accordance with the present invention, compressed air is cooled by heat interchange with countercurrently flowing low pressure nitrogen component gas and oxygen component gas. The refrigerated air is separated by rectification in two stages, a high pressure stage and a low pressure stage, into low pressure oxygen and nitrogen components. A portion of the high pressure nitrogen component gas is withdrawn from the high pressure stage and warmed by heat exchange with a stream of the compressed air. In this warming step, the high pressure nitrogen component gas aids in deriming the heat interchanger means either directly or indirectly by increasing the mass of cooling gas. The warmed high pressure nitrogen component gas is then expanded with work to supply refrigeration to the system and the expanded nitrogen component gas added to the low pressure nitrogen component. Thus, the high pressure nitrogen component gas is used for the dual purpose of aiding in deriming the heat interchanger path and to overcome or balance refrigeration losses in the cycle. In a modification, the congealable impurities are removed from a portion of the air in one heat interchanger path and the remainder of the air cleaned up chemically, the remainder of the air being then cooled in a second heat interchanger path. A preponderance of gaseous product is relied upon to purge the first heat interchanger path, and high pressure nitrogen component gas on the way to a make-up refrigeration expansion step is warmed up in, and thereby balances, the second heat interchanger path. In addition, the relative lengths of the heat interchanger paths may be balanced by transferring cold gas from one heat interchanger path to another heat interchanger path to equalize the temperature difference between the air and the cooling gas in these heat interchangers.

These and other objects and advantages will become more readily apparent from the following description, taken with the accompanying drawings, in which.

In each of the air fractionating cycles illustrated in the accompanying drawings, the incoming air is compressed to a moderately high pressure and then refrigerated by effecting heat exchange between the compressed air and returning oxygen and nitrogen component gases. The refrigerated air is passed to a fractionating zone including a high pressure stage or section and a low pressure stage or section separated by a vaporizer condenser zone. The air is discharged into the high pressure section and separated into a liquid crude oxygen fraction which is collected at the lower end of the high pressure section. The high pressure nitrogen fraction is collected at the upper end of the high pressure section and is partially condensed by heat exchange with the liquid oxygen of the low pressure stage in the vaporizer condenser zone. The liquid crude oxygen and the liquid nitrogen are passed to the low pressure section where the liquid crude oxygen is fractionated into liquid oxygen product using the liquid nitrogen as reflux. Gaseous low pressure nitrogen component collects at the top of the low pressure section and the liquid oxygen product collects at the bottom of the low pressure section. Gaseous low pressure nitrogen is withdrawn from the top of the low pressure section and gaseous low pressure oxygen product having the desired degree of purity is withdrawn from the low pressure section above the vaporizer condenser zone, the low pressure component gases being then returned to refrigerate the incoming air stream. In each of the systems, part of the high pressure nitrogen gas collecting at the upper end of the high pressure section is withdrawn in gaseous form and while at this relatively high pressure is warmed by heat exchange with a countercurrently flowing stream of the incoming air which air stream is being simultaneously cooled by heat exchange with the low pressure component gas. The warmed high pressure nitrogen gas is then expanded with work and mixed with the low pressure nitrogen component gas flowing from the low pressure section of the fractionating zone to heat interchange with the air.

Figure 1:
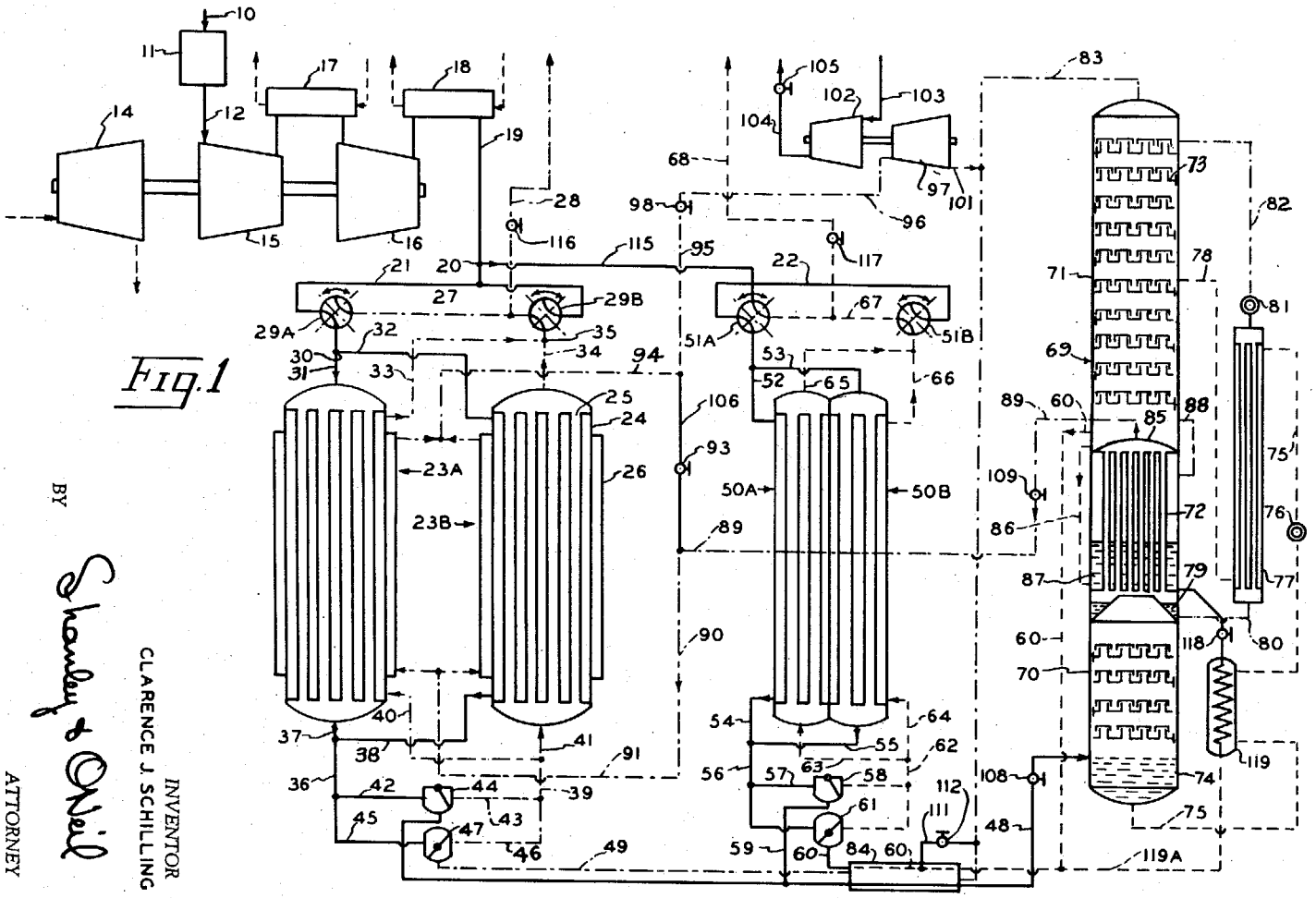
FIGURE 1 is a diagrammatic representation of an air fractionating system illustrating principles of the present invention with switching heat exchangers in which the air supply is refrigerated with returning nitrogen and oxygen components.

Referring to FIGURE 1 of the drawings, air enters the system at 10 and is substantially freed from dust in an air cleaner 11. This element may be an electrostatic precipitator, a scrubber or a simple air filter. It is not essential to remove the dust completely, but only the coarser particles which might cause abrasion in the compression unit.

The cleaned air passes at 12 to a compression unit consisting of a steam turbine or other power source 14, a first and a second stage turbocompressor 15 and 16, a water-cooled intercooler 17 and an aftercooler 18.

The compressed air leaves the aftercooler via conduit 19 at about 100 pounds absolute and at a temperature about 300° Kelvin. This conduit is branched at 20, about 80% of the air supply passing to a header 21 and thence to the nitrogen interchangers and about 20% to header 22 and thence to the oxygen interchangers.

The system includes a pair of "switching" or deriming heat interchangers 23A—23B which are used in parallel for cooling the larger portion of the air supply by heat interchange against the cold gaseous nitrogen produced by the column. Each of these units consists generally of a shell 24, a gaseous nitrogen passage consisting of a plurality of tubes 25 and an auxiliary gas passage illustrated as an external gas jacket 26.

The upper ends of the interchangers communicate with the nitrogen manifold 27, which in turn is vented from the system through a nitrogen vent pipe 28, through a pair of reversing valves 29A—29B. These valves are reciprocated through quarter turns, in synchronism and at suitable intervals, by means not shown. With these valves in the position shown in the figure, the right end of air manifold 21 is closed and air passes from the left end of the manifold through valve 29A to a conduit which is branched at 30 to deliver air through conduit 31 to the tubes of interchanger 23A and through conduit 32 to the shell of interchanger 23B. In this position, the left end of nitrogen manifold 27 is closed and the right end is in communication with the shell of interchanger 23A through conduit 33 and with the tubes of interchanger 23B through conduit 34, these conduits connecting at 35. When the valves are simultaneously reversed in position, as by a quarter turn clockwise, the functions of the described conduits are reversed, conduits 31 and 32 carrying vent nitrogen and conduits 33 and 34 carrying entering air.

Where tube and shell structure is used, the coupling of the interchangers in such manner that each divided stream flows always through the tubes of one interchanger and the shell of the other is important in avoiding variations in resistance to flow of low pressure gaseous nitrogen which often accompany valve reversals when a pair of interchangers are connected so that the flow of nitrogen is directed first through two sets of tubes and then through two shells.

The lower ends of the interchangers are coupled in a similar manner to manifolds which alternately convey air and nitrogen. Thus, manifold 36 is branched at 37 to the tubes of interchanger 23A and at 38 to the shell of interchanger 23B. Manifold 39 is oppositely branched, i.e., at 40 to the shell of interchanger 23A and at 41 to the tubes of interchanger 23B. These manifolds are also branched at 42 and 43 to opposite sides of a flap valve 44, and at 45 and 46 to opposite sides of a flap valve 47.

With the reversing valves 29A—29B in the positions shown, manifold 36 is conveying air under relatively high pressure while manifold 39 is conveying nitrogen at a much lower pressure. The overbalancing pressure in branch 42 swings the flap of valve 44 to the right, as illustrated, preventing the air from entering the opposite manifold through branch 43 and directing it into conduit 48 which leads to the fractionating column. The flap in valve 47 being pivoted below its center line, the excess pressure in branch 45 tips to the right, as illustrated, affording a passage for nitrogen from conduit 49, leading from the fractionating column, into branch 46 and manifold 39 which passes gas upwardly through the interchangers.

The oxygen interchangers 50A—50B are structurally identical with the nitrogen interchangers above described except for the omission of the jackets 26. Air from the compression unit passes from manifold 22 through reversing valve 51A and branch conduits 52 and 53 to the shell of interchanger 50A and to the tubes of interchanger 50B and through bottom connections 54 and 55, manifold 56, branch 57, flap valve 58 and conduit 59 to air conduit 48 leading to the column. Oxygen in gaseous form, withdrawn from the fractionating column through conduit 60, flows through flap valve 61, manifold 62 and branches 63 and 64 to the tubes of interchanger 50A and the shell of interchanger 50B, escaping at the upper ends of the exchangers through conduits 65 and 66 to valve 51B, manifold 67 and product oxygen delivery pipe 68.

The fractionating column generally indicated at 69 may be of any conventional or preferred two-stage column. In any case it consists of a high pressure section 70 and a low pressure section 71 separated by a partition plate and a refluxing nitrogen condenser 72. Each of the sections is provided with bubble plates 73.

Liquid crude oxygen collecting in a pool 74 in the base of the high pressure section passes through a conduit 75 and an expansion valve 76 to an interchanger 77 in which it is in counterflow heat interchange with high pressure liquid nitrogen, the expanded crude oxygen then passing through conduit 78 to an intermediate point in the low pressure section.

The high pressure liquid nitrogen collecting in pool 79 below the nitrogen condenser passes through conduit 80 to the opposite side of interchanger 77 in which it is cooled and stabilized by the expanded crude oxygen, flowing thence through expansion valve 81 and conduit 82 to the upper end of the low pressure section.

Gaseous low pressure nitrogen is withdrawn from the top of the column through conduit 83, flowing to a jacket 84 surrounding a part of the air feed line 48, this jacket discharging into conduit 49 above referred to as leading to the nitrogen interchangers.

Oxygen in a desired state of purity, ordinarily 95% or over, collects over the head 85 of condenser 72 and flows through conduit 86 to form a pool 87 surrounding tubes 72. Boiling in this space in condensing high pressure nitrogen vapor within the tubes, the oxygen vapor travels through bypass 88 to the vapor space above head 85, from which it is withdrawn through conduit 60 and the air-nitrogen interchanger 84 to the oxygen interchangers as above described.

The interchangers are operated in the customary manner, the warm air passing through one side of each unit in counterflow to one of the cold product gases until the air passages become sufficiently fouled, by the accumulation of water ice and solid carbon dioxide, to give rise to a high pressure differential or to fall below a predetermined heat transfer efficiency. At this point the reversal of the valves causes the air stream to flow through the passage previously occupied by the cold gas, and which is clean, while the gas stream flows through the passage previously occupied by air, vaporizing and removing the ice and carbon dioxide snow.

It is a well known drawback to this procedure that the total products of fractionation flowing through a cold accumulator or its functionally equivalent deriming interchanger do not completely and dependably remove the accumulation of carbon dioxide snow and water ice from the surfaces on which they are deposited, and that such substantially complete removal may be effected by passing through the interchanger a quantity of cold gas materially greater than the quantity of air from which these deposits are accumulated.

To provide complete deriming for long period operation, it is essential that the cold end temperature difference between incoming air and purging product be 5° C. or less. To accomplish this, it is necessary to compensate for the higher specific heat of air under pressure especially at lower temperature. Adding quantity to the effluent product makes this possible by bringing the temperature-enthalpy curves of the counterflowing gases into approximate parallelism.

It is not necessary that the excess cold gas be in contact with the deposited solids, but only that it be in heat interchange relation with them. In consequence there are numerous ways in which this compensation may be effected in any interchanger, accumulator or tubular, in which the gas to be cooled and the gas to be heated flow alternately through the same passage.

In the operating cycle here described the oxygen interchangers 50A—50B are provided with an excess of the cold gas by passing through them a smaller quantity of air than that which corresponds to the quantity of oxygen produced, for example, say 20% of the total air supply instead of the 21% to 22% which would correspond with the oxygen yield.

The remainder or say 80% of the air supply passes through the nitrogen interchangers 23A—23B and the excess of cold gas is provided by nitrogen withdrawn in gaseous form from the high pressure section of the column, heated by passing through the nitrogen interchanger, cooled by expansion and returned at low pressure to pass again through the interchanger with the low pressure nitrogen taken from the top of the column, thus passing twice through the step of interchange.

In more detail, a sufficient quantity of gaseous nitrogen, which may for example be perhaps 20% of the total nitrogen content of the air fractionated, is withdrawn from the dome 85 of the column condenser 72, carrying with it any incondensable gases which might otherwise tend to accumulate there. The withdrawn gas, at about 100 pounds absolute and about 100° K., passes through conduits 89, 90 and 91 and is equally divided between the auxiliary gas passages 26 of the nitrogen interchangers, in which its temperature is raised to about 145° K., by interchange with entering warm air. These streams, which flow continuously through the two interchangers in parallel and constantly from the cold to the warm end, are collected in conduit 94 and pass through conduits 95 and 96 to a turbo-expander 97. During normal operation, valve 98 in conduit 95 is open.

In the expander 97 the pressure is reduced to about 24 pounds absolute in doing work and the temperature is thus reduced to about 110° K. The expanded nitrogen stream then passes through conduit 101 to mix with the colder nitrogen stream passing through conduit 83, the temperature of the mixed nitrogen stream at the cold end of the interchangers being thus raised to about 96° K.

The withdrawal of as much as 20% of the total nitrogen made in this manner does not reduce the quantity of reflux liquid sufficiently to interfere with efficient operation of the low pressure column section, so long as oxygen of the highest purity is not required.

The expander 97 is coupled with a turbo-compressor 102 or other means for applying a power load. The compressor is desirable as providing a steady and readily controllable load. It is illustrated as taking air through conduit 103 and discharging it through a conduit 104 controlled by a valve 105. If the oxygen produced by the column is to be delivered into a pipe line at a pressure above that available at the interchanger outlet, compressor 102 may be utilized for that purpose.

It is desirable to provide a cross-over line 106 to admit a controlled quantity of cold nitrogen into conduit 95 in case the temperature of the high pressure nitrogen passing from the jackets to the expander becomes too high. This quantity is controlled by regulation of valve 93.

It should be noted that the drawing shows only one turbo-expander 97. This unit, expanding the withdrawn high pressure nitrogen, suffices to provide make-up refrigeration for the cycle but when of proper size for that purpose is insufficient to provide refrigeration for starting up a warm apparatus. For this purpose it is desirable to provide the expander in duplicate or even in triplicate to ensure quick starts after a shut-down.

The operating cycle above described is advantageous over previously disclosed methods for controlling the temperature of the cold nitrogen entering the nitrogen interchangers, in doing away with the splitting of the air feed and with the introduction of air into the low pressure stage.

In methods heretofore proposed, a part of the air cooled in the main interchangers is diverted away from the high pressure section of the column through an interchange against a minor stream of product nitrogen passing to the interchangers or against the incoming air, this minor stream being then expanded and introduced into the low pressure column. This introduction lowers the efficiency of fractionation in the low pressure section and the purity of the oxygen obtainable under given conditions, but is most objectionable in adding greatly to the difficulty experienced in regulating the operation of the column.

By applying the heating effect to a small part of the available high pressure nitrogen and diverting it to the interchangers without entering the column, the regulation of nitrogen interchanger temperature is rendered wholly independent of regulation of column operation, and both are simplified without loss of refrigerative effect or interference with the most desirable column operating conditions. A further advantage in the described cycle lies in a material reduction in the size of the column required.

As is well known, it is possible for frozen hydrocarbons to accumulate at the bottom of liquid oxygen pool 87, giving rise to risk of explosion. To avoid this risk it is desirable to withdraw continuously a small stream of liquid oxygen from the bottom of the pool, as through valve 118, and pass this liquid downwardly through a vaporizing coil 119 heated by the stream of crude oxygen flowing through conduit 75. The resultant oxygen vapor, carrying the volatilized hydrocarbons, passes through conduit 119A to join the stream of gaseous oxygen flowing through conduit 60.

Figure 2:
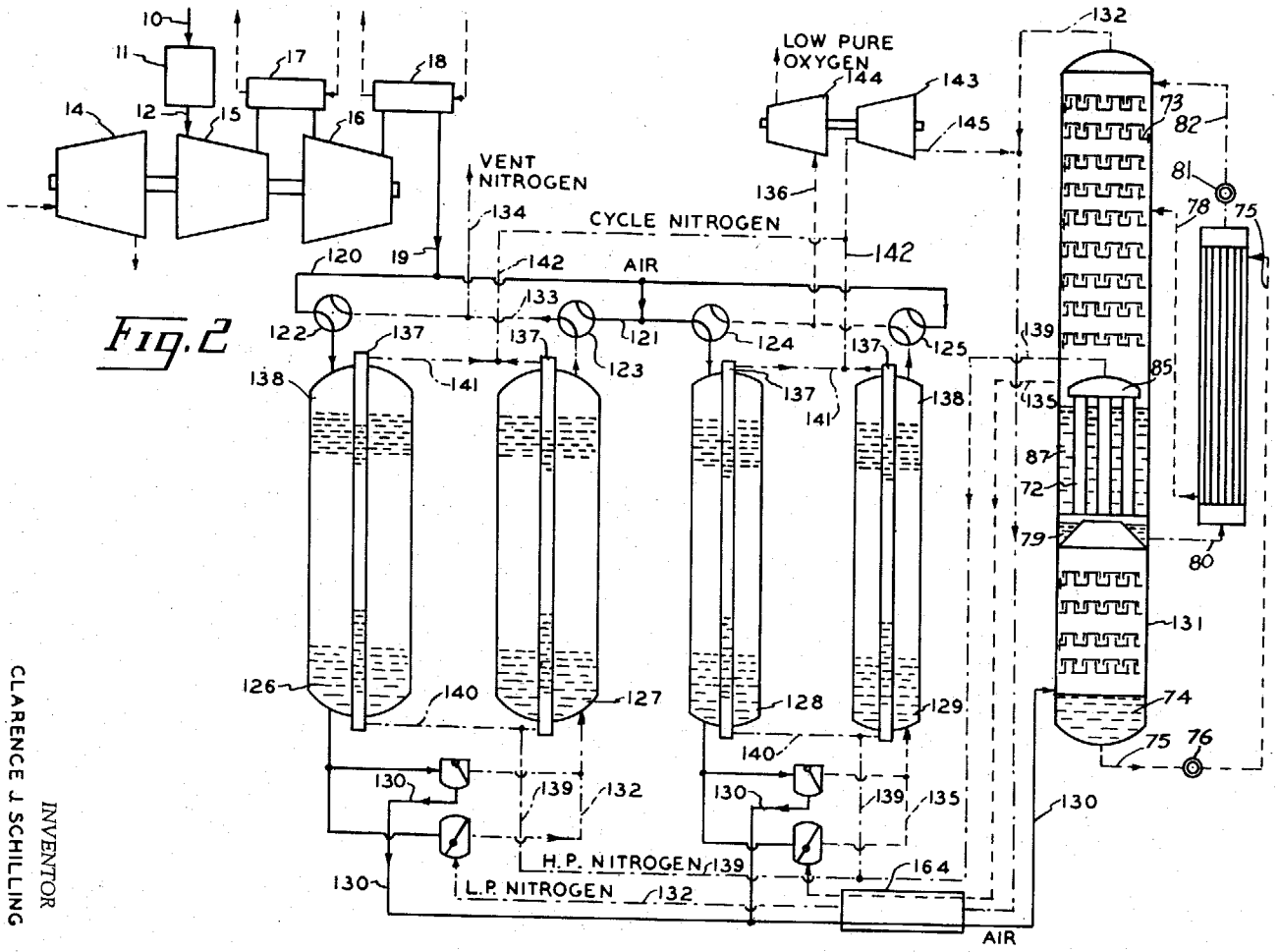
FIGURE 2 is a diagrammatic representation of a different air fractionating system illustrating the principles of the present invention, with switching accumulators.

FIGURE 2 illustrates certain alternatives to the procedure and apparatus already described:

(a) In the substitution of indirect heat interchangers (the so-called cold accumulators) for the switching tubular heat interchangers of FIG. 1, a pair of accumulators being the full equivalent of a single switching interchanger.

(b) In the application of the unbalancing effect to both the nitrogen and the oxygen interchanger instead of to the nitrogen interchanger only.

These variants may be used in any combination, i.e., either or both interchangers may be unbalanced by the high pressure nitrogen cycle, and either or both may be of the tubular or of the accumulator type.

The modified plant illustrated in FIG. 2 has the same air supplying elements, numbered from 10 to 19 inclusive, as are shown in FIG. 1, and these need not again be described.

The air supply at a preferred pressure, which for example may be about 100 pounds absolute, passes through conduits 120 and 121 to four reversing valves 122—123—124 and 125 which are functionally similar to valves 21 and 51 of FIG. 1 and which control the flow of gases into and out of the upper ends of indirect heat interchangers ("cold accumulators") 126 and 127 for product nitrogen and 128 and 129 for oxygen, these elements having the customary filling of metal exposing a large surface area.

With the valves in the position shown, air is flowing downwardly through interchangers 126 and 128 into conduit 130 by which it is passed into the high pressure section of two-stage column 131. Column 131 is similar to column 69 of FIG. 1 and like numerals in each designate the same parts. At the same time, gaseous nitrogen flowing from the low pressure section of the column through conduit 132 is passing upwardly through interchanger 127 and through conduit 133 to a vent 134, while oxygen at a desired purity, as for example 95%, flows from the low pressure section of the column through conduit 135, passes upwardly through interchanger 129 and leaves the interchanger by way of conduit 136.

On moving the rotors of the control valves through 90° the gas flows are reversed, air passing downwardly through interchangers 127 and 129 while nitrogen flows upwardly through interchanger 126 and oxygen through interchanger 128. These reversals have already been described in detail in connection with FIG. 1.

Gaseous nitrogen is withdrawn from the high pressure section of the column through conduit 139 and is distributed by manifolds 140—140 to the four secondary passages 137—137. This flow is constant through the four secondary passages in parallel and in a direction opposite to that of air flow through the primary passages. The nitrogen streams, still at approximately the pressure carried in the high pressure section of the column, are collected in manifolds 141—141 and flow through conduits 142 to an expansion engine 143 which may well be a turbo-expander. This element is loaded by a compressor 144 which may conveniently be used to raise the oxygen product delivered to its through conduit 136 to pipe line pressure.

In expander 143 the high pressure gaseous nitrogen is reduced to substantially the pressure carried in the low pressure column section, the expanded stream passing through conduit 145 to join the stream of gaseous nitrogen flowing through conduit 132 to the nitrogen interchangers 126 and 127.

It is desirable to pass air conduit 130, nitrogen conduit 132 and oxygen conduit 135 through the interchanger 164 in which the air stream is lightly cooled in imparting a relatively small amount of heat to the streams of product nitrogen and oxygen in advance of the main interchanger.

As in this modification of the operating cycle the unbalancing effect is applied to both pairs of interchangers only as in FIG. 1, the warm air supply is divided between the two pairs of interchangers in at least approximately the proportions in which the gaseous products are obtained from the main column.

Figure 3:
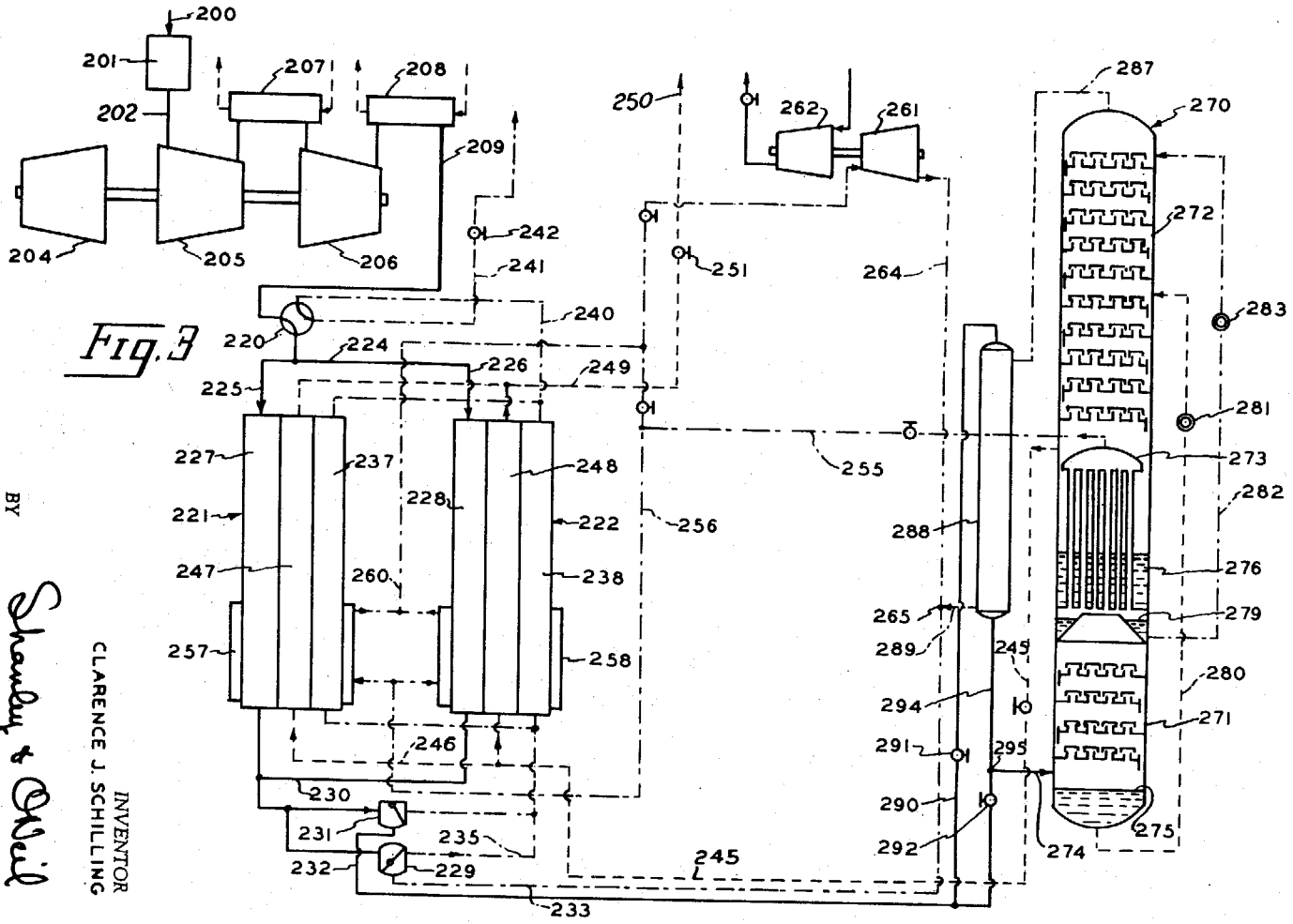
FIGURE 3 is a diagrammatic representation of an air fractionating system illustrating the principles of the present invention in which a different type of heat interchanger is shown.

Referring to FIGURE 3 of the drawings, air enters the system at 200 and is substantially freed from dust in a cleaner 201. The clean air passes through line 202 to a compression unit including a power source 204 operating a first stage turbo-compressor 205 and a second stage turbo-compressor 206. The air flows from the first compressor 205 through an intercooler 207 and then through the second turbo-compressor 206 to aftercooler 208, leaving the aftercooler 208 by way of conduit 209 and is at the desired pressure and temperature which, for example, may be about 100 pounds absolute and 300° Kelvin. The air passes through conduit 209 to a reversing valve 220 which is similar to valve 29 of FIGURE 1 and which is used for switching the flow of cold low pressure nitrogen component gas and the flow of air through the common passages of the interchanger 221 and 222. Interchangers 221 and 222 are schematically illustrated as the modern type in which a plurality of passages manifolded together conduct one gas in heat exchange relation with similar passages for the other products. The switching interchangers 221 and 222 are identical and any number of interchangers may be used for cooling the compressed air by heat exchange with the low pressure nitrogen and oxygen component gases returning from the fractionation column. While two interchangers are shown, one interchanger may be sufficient if it has a large enough capacity or more than two interchangers may be used.

With the switching valve 220 in the position shown, air flows from the valve through header 224 and lines 225 and 226 to the passageways 227 and 228 of the interchangers. The refrigerated air flows from passages 227 and 228 through conduit 230 to valves 299 and 231. The air pressure holds the flaps in these valves in the biased position shown in the drawing and air flows through valve 231 to conduit 232 which leads to the fractionation column.

At the same time cold, low pressure nitrogen component gas flows from conduit 233 through valve 229 to conduit 235 which supplies nitrogen component gas to passages 237 and 238 of interchangers 221 and 222, respectively. Thus, air is flowing downwardly through the interchanger passages 227 and 228 in heat exchange relationship with countercurrently flowing low pressure nitrogen component gas flowing up through passages 237 and 238. The warmed, nitrogen component gas flows from the interchangers 221 and 222 through conduit 240 to valve 220 and then through conduit 241 and out of the system. Conduit 241 contains a back pressure control valve 242.

When valve 220 is rotated through a quarter turn, the flow of nitrogen component gas and air is switched so that air then flows through conduit 240 and down through passages 237 and 238 and nitrogen component gas flows through conduit 230 and up through passages 227 and 228.

Cold, dry oxygen component gas of the desired purity flows from the low pressure section of the column 270 through conduit 245 to header 246 and then through passages 247 and 248 of the interchangers 221 and 222. The warmed oxygen component gas flows upwardly from the interchangers through conduit 249 and out of the system at 250. A back pressure control valve 251 is provided in conduit 249 for controlling the flow of oxygent component gas. The oxygen component gas flows continuously through passages 247 and 248 whereas the periodic rotation of valve 220 described above causes alternate flow of the air and nitrogen component gas through passages 227 and 237 of interchanger 221 and passages 228 and 238 of interchanger 222.

High pressure nitrogen gas is withdrawn from the high pressure stage of the column 270 through conduit 255 and flows through conduit 256 and the passageways 257 and 258 of the interchangers. The passageways 257 and 258 are illustrated as extending through the cold end only of the heat interchangers 221 and 222 and the direction of flow is opposite to that of air flow through passages 227 and 228. This high pressure nitrogen stream, while substantially at a pressure of the high pressure stage, flows through conduit 260 to the expansion engine 261 which preferably is a turbo-expander of the type shown and described in connection with FIGURE 1. The expansion engine 261 is shown loaded by a compressor 262 which may be used for any desirable purpose.

In the expansion engine 261, the high pressure gaseous nitrogen is expanded to substantially the pressure carried in the low pressure stage of the column, for example, 24 pounds per square inch absolute while producing work. The expanded stream of nitrogen at a temperature of, for example, 110° Kelvin flows from the expansion engine 261 through conduit 264 to join and warm the low pressure nitrogen component gas in conduit 233 at 265 so that the stream of gas in conduit 233 has a temperature of about 96° Kelvin.

The two stage fractionating column 270 is of conventional design and includes a high pressure stage 271, a low pressure stage 272, and a nitrogen condenser-oxygen vaporizer 273 therebeween. In the high pressure stage the refrigerated air under pressure which enters the column at 274 is separated into a nitrogen component and a crude oxygen component. The oxygen rich liquid collects in the bottom of the column in a pool 275. At the top of the high pressure stage nitrogen gas flows up into the condenser 273 and is in heat exchange with the pool of liquid oxygen 276 in the bottom of the low pressure stage. The nitrogen is partially liquefied and the liquefied nitrogen collects in a pool at 279. The crude high pressure oxygen liquid flows through conduit 280 and expansion valve 281 to the low pressure stage 272. The nitrogen liquid flows through conduit 282 and expansion valve 283 to the low pressure stage 272 to provide reflux liquid.

The low pressure gaseous nitrogen component is withdrawn from the low pressure stage through conduit 287 and while substantially at the pressure of the low pressure stage, passes through a heat exchanger 288 and then out of the heat exchanger through conduit 289 to conduit 233. As the low pressure nitrogen gas flows through the heat exchanger 288, it is in heat exchange relationship with a portion of the refrigerated air withdrawn from conduit 232 through conduit 290. A valve 291 in conduit 290 and a valve 292 in conduit 232 control the amount of air passing through the heat exchanger 288. The air flows from the heat exchanger 288 through conduit 294 and is mixed with the remainder of the air at 295, with all of the air entering the column at 274. In heat exchanger 288 the product nitrogen gas is warmed and the air is cooled so that the refrigerated air discharged into the high pressure column will be substantially at the liquefaction temperature.

The operation of the system shown in FIGURE 3 and the function of the interchangers 221 and 222 and of the expansion engine 261 are generally the same as set forth in the description of the apparatus of FIG. 1. In the interchangers, the air is refrigerated with countercurrently flowing low pressure oxygen and nitrogen component gases. The total mass of component gas at the low pressure is substantially equal to the total mass of air flowing through the interchangers. The high pressure nitrogen flowing through the cold end of the interchangers increases the mass of cooling gas and aids reducing the temperature difference between the air and the low pressure nitrogen component gas so that the nitrogen component gas will sweep out the material previously deposited in the common passages by the countercurrently flowing air. With high pressure nitrogen flowing only through the cold end of the interchangers, this gas is in heat exchange with the gases in the interchangers only in the zone where the carbon dioxide is deposited from the air and not in the zone where moisture is deposited. In practice, it is the removal of the carbon dioxide which presents the problem, the water being normally removed without the need of special provision for the temperature difference reduction.

Preferably, the high pressure nitrogen is flowed through the cold end of the exchangers including the zone in which carbon dioxide is deposited to reduce the temperature difference between the air and the low pressure nitrogen component gas to about 5° C., or less. The supplemental cooling gas, that is, the high pressure nitrogen gas, may flow backwardly the entire length of the switching exchangers 221 and 222 as shown in the case of exchangers 23A and 23B of FIGURE 1, but this has the disadvantage of increasing the length of the heat exchange means. Additionally, the temperature difference can be reduced by locating the passages 257 and 258 above the position shown so that the high pressure nitrogen passes only through a region on the warm side of the zone in which carbon dioxide is deposited. This also has the disadvantage of reducing the temperature difference between the air stream and the deriming component gas stream over a longer flow path which in turn necessitates an increase in the length of the exchangers. In the systems of FIGURES 1 and 2, if desired, the high pressure nitrogen can be returned through only part of the length of the interchangers, preferably the cold end, instead of the entire length as shown.

The fact that the oxygen product does not act to sweep out the carbon dioxide and water deposits in this modification, does not materially affect the cycle since this gas is in heat exchange relation with the zones of deposit of these substances. It therefore favorably influences the temperature difference which is the principal factor in the purging phenomenon.

Figure 4:
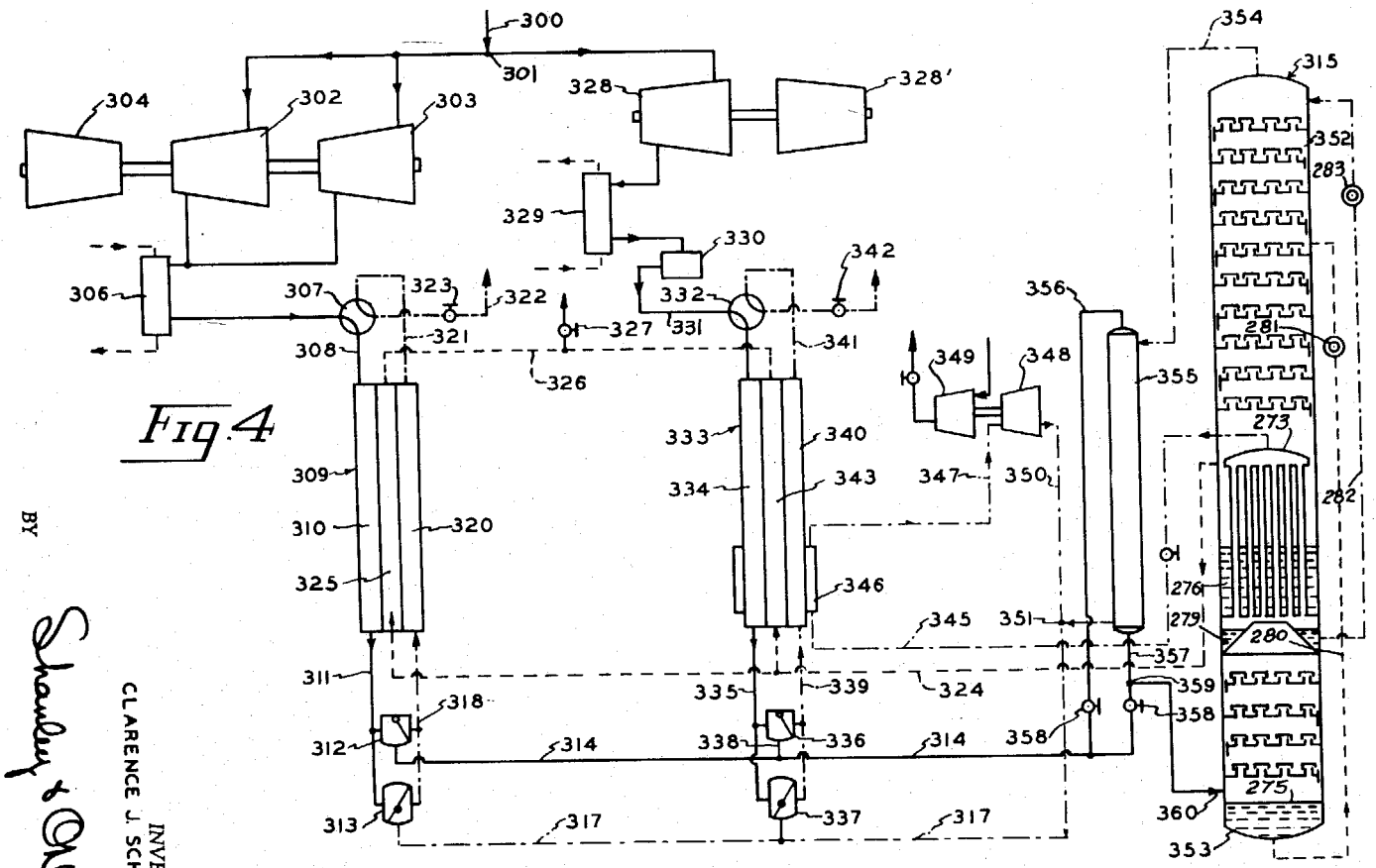
FIGURE 4 is a diagrammatic representation of an air fractionating system illustrating a variation of the present invention.

Referring to the variation of the present invention illustrated in FIGURE 4 of the drawings, air which has been previously cleaned of dust, enters the system at 300 and at point 301 this air supply is divided, with a major portion, for example, 67% of the air being compressed in a pair of turbo-compressors 302 and 303. These compressors may be actuated by any suitable power means 304. The air compressed to a suitable pressure, for example, about 100 pounds per square inch absolute, flows from the compressors through aftercooler 306 and then to a reversing valve 307. With the valve 307 in the position shown, compressed air flows through a conduit 308 to an interchanger 309 and flows down through interchanger passage 310, being cooled therein by heat exchange with cold component gas returning from the fractionating column 315. The refrigerated air leaves the bottom of the interchanger through conduit 311. In flap valves 312 and 313, which are the same as the valves 44 and 47 shown in FIGURE 1, the air under pressure biases the flaps of the valves so that the refrigerated air flows through valve 312 to conduit 314 and then to the two stage fractionating column 315.

With the reversing valve 307 in the position shown, cold and dry nitrogen component gas at a low pressure substantially the same as the low pressure maintained in the low pressure stage of the fractionating column flows from conduit 317, through valve 313 and line 318 to the interchanger 309, upwardly through passage 320 and leaves the interchanger through conduit 321. The warmed nitrogen gas flows through conduit 321 to reversing valve 307, through conduit 322 and thence out of the system. Valve 323 controls the back pressure. As the air flows down through passage 310 congealable material, for example, carbon dioxide, is deposited in the passage. Periodically the reversing valve 307 is rotated through a quarter turn to switch the air and nitrogen passages so that air will flow downwardly through passage 320 and nitrogen gas will flow upwardly through passage 310. For reasons set out below, the upwardly flowing stream of nitrogen carries out all previously congealed material, such as the carbon dioxide.

Cold, dry low pressure oxygen component gas flows continuously from conduit 324 upwardly through the interchanger passage 325 to header 326, leaving the system through back pressure controlling valve 327.

In order to reduce temperature difference between the refrigerated air and the cold component gases at the lower end of the interchanger, a larger mass of component gas is passed upwardly through the interchanger 309 than the mass of air passing down through the interchanger. For example, about 70% of the total component gases may be passed upwardly through the interchanger to cool about 67% of the air. This 70% of component gas may be made up of 70% of the nitrogen component produced from all of the air and 70% of the oxygen component gas produced from all of the air or the nitrogen and oxygen components may be present in different ratios with limits. If it be assumed that 100 pounds of air is to be fractionated in the system, then 67 pounds of the air will be cooled by heat exchange with 70 pounds of component gas. This 70 pounds of component gas may, for example, comprise 56 pounds of nitrogen component and 14 pounds of oxygen or may comprise 60 pounds of nitrogen component and 10 pounds of oxygen component or may consist of 70 pounds of nitrogen component. The nitrogen component must be in sufficient quantity to accomplish a purging action at the efficient temperature difference with which the interchanger is designed to operate. With the relatively larger mass of component gas flowing up through the interchanger, the nitrogen will completely remove the deposited congealable materials, particularly the carbon dioxide.

A minor portion of the air to be fractionated in the system, for example, 33% of the air is compressed by the turbo-compressor 328, driven by power means 328', and then cooled in the aftercooler 329. The cooled compressed air flows through a carbon dioxide removing unit 330 in which the carbon dioxide is reduced to unobjectionable proportions by chemical means. From the unit 330 the minor portion of air flows through conduit 331 to reversing valve 332. With the reversing valve 332 in the position shown, the compressed air flows to interchanger 333 and down through interchanger passage 334 to the conduit 335. As the air flows through the interchanger 333, it is cooled by heat exchange with component gases flowing backwardly from the fractionating column 315. The refrigerated compressed air holds the flaps of valves 336 and 337 in the position shown so that the air flows through valve 336 and conduit 338 to conduit 314, where this minor portion of the refrigerated air is mixed with the major portion of refrigerated air from interchanger 309 before flowing to the column 315.

Cold, low pressure nitrogen component gas flows from conduit 317 through valve 337 and conduit 339 to interchanger 333. The nitrogen component gas flows through passage 340 in heat exchanger relationship with the air stream flowing through passage 334. The warmed nitrogen gas leaves the upper end of the interchanger and flows through conduit 341 to reversing valve 332 and then through back pressure control valve 342 and out of the system.

Cold oxygen component gas flows continuously from conduit 324 up through passage 343 of interchanger 333 and the warmed oxygen gas leaves the interchanger passing to header 326 and out of the system through valve 327 along with the oxygen warmed in interchanger 309.

The valve 332 is a reversing valve and the flow of air and nitrogen through passages 334 and 340 is reversed in the same manner as described in connection with interchanger 309. It is to be noted that the air flowing through interchanger 333 has previously been cleaned of carbon dioxide gas so the nitrogen leaving the system at 341 is relatively pure and does not contain carbon dioxide. However, this nitrogen will contain water vapor since this part of the air has not previously been treated to remove all of the water. For this reason interchanger 333 is switched.

About 30% of the component gases flow up through interchanger 333 in heat exchange with about 33% of the total amount of air. Thus, the mass of air cooled in interchanger 333 is larger than the mass of low pressure component gases flowing up through the interchanger. In order to cool the air in interchanger 333 to about the same temperature that the air is cooled in interchanger 309, high pressure nitrogen gas is withdrawn from the high pressure section of column 315 through conduit 345. The high pressure nitrogen gas at substantially the same pressure as that of the high pressure stage of the fractionating column, flows through passageway 346 in heat exchange relationship with the air flowing through interchanger 333. The warmed high pressure nitrogen flows from the passageway 346 through conduit 347 to the expansion engine 348. In the expansion engine the high pressure nitrogen is expanded with work to about the pressure of the low pressure stage of the fractionating column. The expansion engine 348 is loaded by any means, such as compressor unit 349. The expanded nitrogen gas flows through conduit 350 to join the low pressure nitrogen component gas at 351 and increase the amount of nitrogen component gas flowing through conduit 317 so that the amount of nitrogen component gas flowing through conduit 317 at this point is equal to the total amount of nitrogen component gas separated from all of the air.

The fractionating column 315 includes a low pressure stage 352 and a high pressure stage 353. This column is operated in substantially the same manner as the column described in connection with FIGURE 3 and is therefore not described in detail. Like numerals in the columns of FIGURES 3 and 4 designate the same parts thereof. The low pressure nitrogen component leaves the low pressure stage through conduit 354 and passes through a heat interchanger 355 in heat exchange relationship with a portion of the air stream diverted from conduit 314 through conduit 356 to the heat exchanger 355. The cooled air passes from the exchanger 355 to conduit 357 and is mixed with the air in conduit 314 at point 359, with all of the air being discharged into the column at 360. The pair of valves 358—358 in lines 314 and 356 serve to control the proportion of air diverted. The warmed nitrogen component gas leaves the exchanger 355 through conduit 360 and is mixed with the expanded nitrogen at point 351.

As previously pointed out the air for interchanger 333 is treated to remove the carbon dioxide. Preferably the interchanger 333 is a switching interchanger of the type shown and described as the air deposits ice in the passages at a point relatively close to the warm end of the interchanger and above passage 346. Water is relatively easily removed by the low pressure nitrogen component gas and the passage 346 need not extend into that section of the interchanger in which the water is deposited.

In the cycle of FIGURE 4, as pointed out above, the air is divided and, for example, about 67% of the air is cooled in exchanger 309 by heat exchange with about 70% of the gaseous components. About 33% of the incoming air is treated to remove the carbon dioxide and then is cooled in heat exchanger 333 by heat exchange with about 30% of the returning product gases and with the high pressure nitrogen. The latter is thus warmed up to about 113° K. and then expanded. As an illustration, the mass of the high pressure nitrogen withdrawn from the high pressure stage may be equal to about 30% of the mass of the scrubbed air for makeup refrigeration purposes. In such case, since 33% of the air is scrubbed, the mass of the high pressure nitrogen is equal to about 9.9% of the mass of the total incoming air. In exchanger 309 a relatively larger mass of low pressure component gas than air being cooled flows backwardly through the entire length of the heat exchanger so the temperature difference between the air and the countercurrently flowing component gas is relatively small throughout the entire length of the heat exchanger. In the heat exchanger 333, and particularly the upper portion thereof, the temperature difference between the air and the relatively smaller mass of countercurrently flowing component gas is relatively large. For a given total range of air cooling, the length of an exchanger of a given type will vary inversely as the temperature difference. Thus, the exchanger 309 must be longer than the exchanger 333. For example, the exchanger 309 might be 30 feet long, while the exchanger 333 would be 15 feet long. Particularly, in large oxygen plants, it is desirable to use a large number of similar exchangers connected in parallel. For example, instead of one heat exchanger 309, it might be necessary to use ten similar exchangers arranged in parallel. A like quantity of heat exchangers 333 would be used. In designing an oxygen plant, it is desirable to have the heat interchangers of uniform length.

Figure 6:
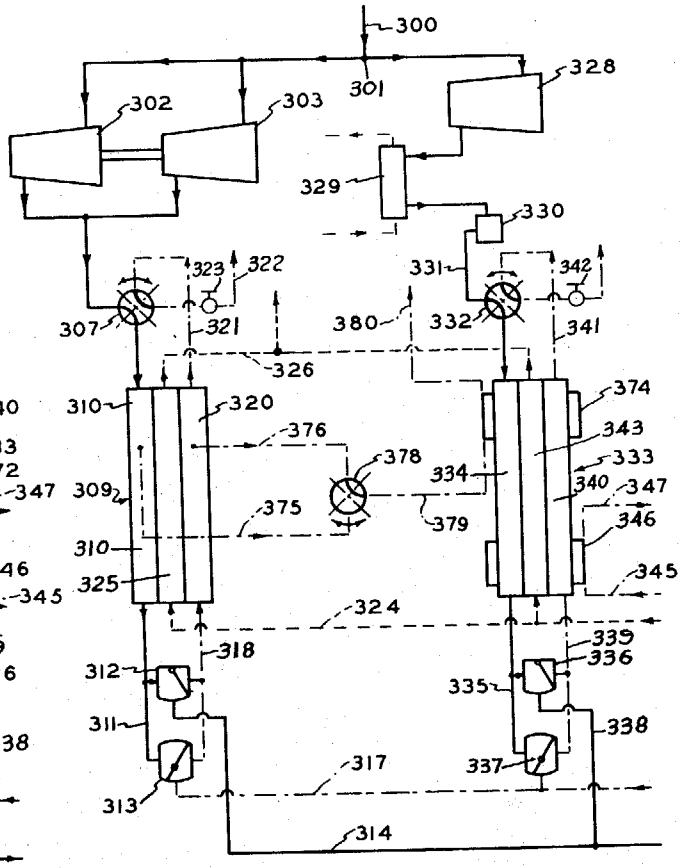
FIGURES 5 and 6 are diagrammatic representations of systems illustrating modifications of the cycle of FIGURE 4, and utilize the same reference numerals to indicate like parts.
Figure 5:
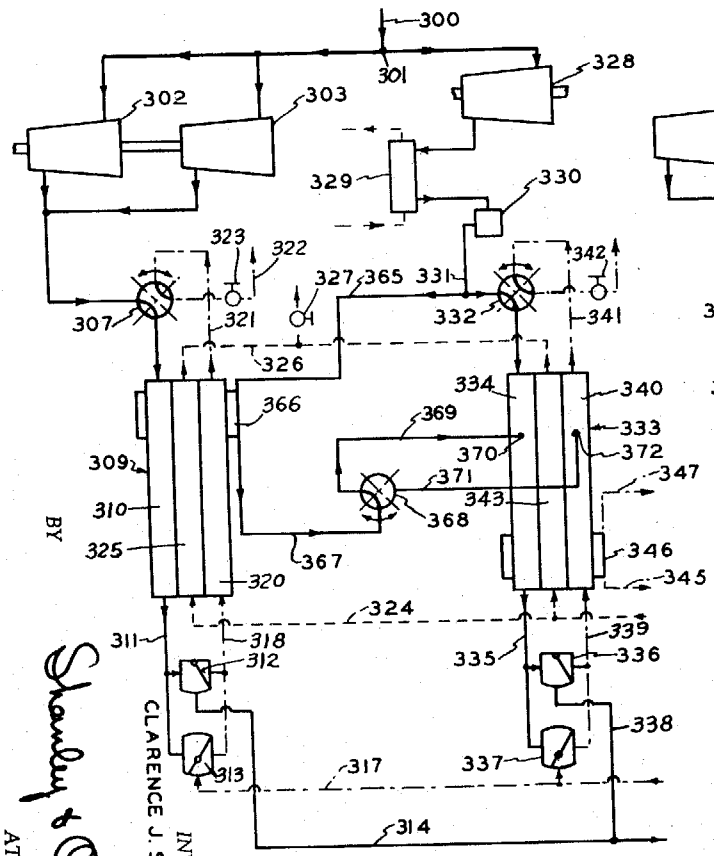

FIGURES 5 and 6 illustrate modification of a portion of the cycle shown in FIGURE 4 in which it is possible to balance the refrigeration requirement and the water and carbon dioxide clean-up problems for any size plant so as to equalize the length of the exchangers.

Referring more particularly to FIGURE 5, part of the air stream is diverted from conduit 331 and flows through conduit 365 to heat interchanger 309 where the air flows through passage 366 in the upper warm end of the interchanger. The air flowing through passage 366 is cooled by heat exchange with cold component gases flowing up through the interchanger. The partially cooled air flows from passage 366 through conduit 367 to reversing valve 368 and with the valve 368 in the position shown, the partially cooled air flows from valve 368 through conduit 369 and is discharged into passage 334 of heat interchanger 333 at point 370 where the air cooled in exchanger 309 mixes with the remainder of the air which has entered the heat exchanger 333 through conduit 331.

When the reversing valve 330 is turned to reverse the interchanger, the valve 368 is also turned so that the partially cooled air flows from conduit 367 to reversing valve 368 and conduit 371 so as to enter passage 340 at point 372.

With the arrangement shown in FIGURE 5, some of the refrigeration available in the cold component gas flowing up through interchanger 309 is utilized in cooling the portion of the air flowing through heat interchanger 333. The air is cooled in the warm end of heat interchanger 309 so as not to affect the conditions in the cold end of the interchanger in which the carbon dioxide is alternately deposited and removed. With this arrangement the temperature difference is increased in the warm end of exchanger 309 and decreased in the warm end of exchanger 333 which decreases the required length of exchanger 309 and increases the required length of exchanger 333.

Referring more particularly to FIGURE 6, the heat interchanger 333 is provided with a heat exchange passage 374. Passages 310 and 320 of heat exchanger 309 are connected through conduits 375 and 376 to reversing valve 378. With valve 378 in the position shown, cold low pressure nitrogen component gas flows from passage 320 through conduit 376, valve 378 and conduit 379 to passage 374. This cold nitrogen component gas flows through passage 374 in heat exchange relationship with the air stream flowing downwardly through heat interchanger 333 and leaves the system through conduit 380. When interchanger 309 is reversed by rotating valve 307, valve 378 is also rotated so that nitrogen gas flows from passage 310 to conduit 375 and valve 378 to conduit 379. The low pressure nitrogen component gas may be withdrawn from heat interchanger 309 at any suitable point but should be withdrawn at a point above the carbon dioxide depositing zone adjacent the lower cold end of the interchanger so as not to decrease the mass of low pressure nitrogen component gas flowing through the interchanger to sweep out the previously deposited carbon dioxide.

In the modifications of FIGURES 5 and 6, refrigeration is transferred from heat interchanger 309 to the heat interchanger 333. This transfer of refrigeration increases the temperature difference in the upper end of interchanger 309 and decreases the temperature difference in the upper end of interchanger 333. Increasing the temperature difference in interchanger 309 decreases the length of interchanger required while decreasing the temperature difference in interchanger 333 has the opposite effect. Thus, the interchangers 309 and 333 can be readily balanced so as preferably to have the same length. Thus, if in the arrangement shown in FIGURE 4 interchanger 309 has a length of 30 feet and interchanger 333 has a length of 15 feet, then in either FIGURES 5 or 6 the length of the interchangers may be balanced so that they all have a length of about 20 feet. As a large number of such interchangers are usually connected in parallel, balancing the lengths of the interchangers is a very important feature.

Removing some of the low pressure nitrogen component gas from a point about midway, or higher, of interchanger 309 as is shown in FIGURE 6, reduces the amount of refrigeration available for cooling the downcoming stream of compressed air. Accordingly, instead of passing about 70% of the component gases into the lower end and then up through interchanger 309 to cool about 67% of the air, a somewhat larger amount of the component gases is passed into interchanger 309. For example, about 72% of the component gases is passed into the lower end of the interchanger 309 which leaves about 28% of the component gases for interchanger 333. Then about 5% of the low pressure nitrogen component gas is withdrawn as shown in FIGURE 6 and passed through a portion of heat interchanger 333 so that in the upper end of heat interchanger 309, 67% of the air is in heat exchange with about 67% of the component gases. In the upper end of heat interchanger 333, 33% of the air is in heat exchange relationship with 33% of the component gases. Similar results are obtained when air is used to transfer refrigeration as shown in FIGURE 5. It is understood that in the upper end of interchanger 309 the mass of air is increased and in the upper end of interchanger 333 the mass of air is decreased to bring the mass of air and component gases into, or more nearly into, balance.

Figure 7:
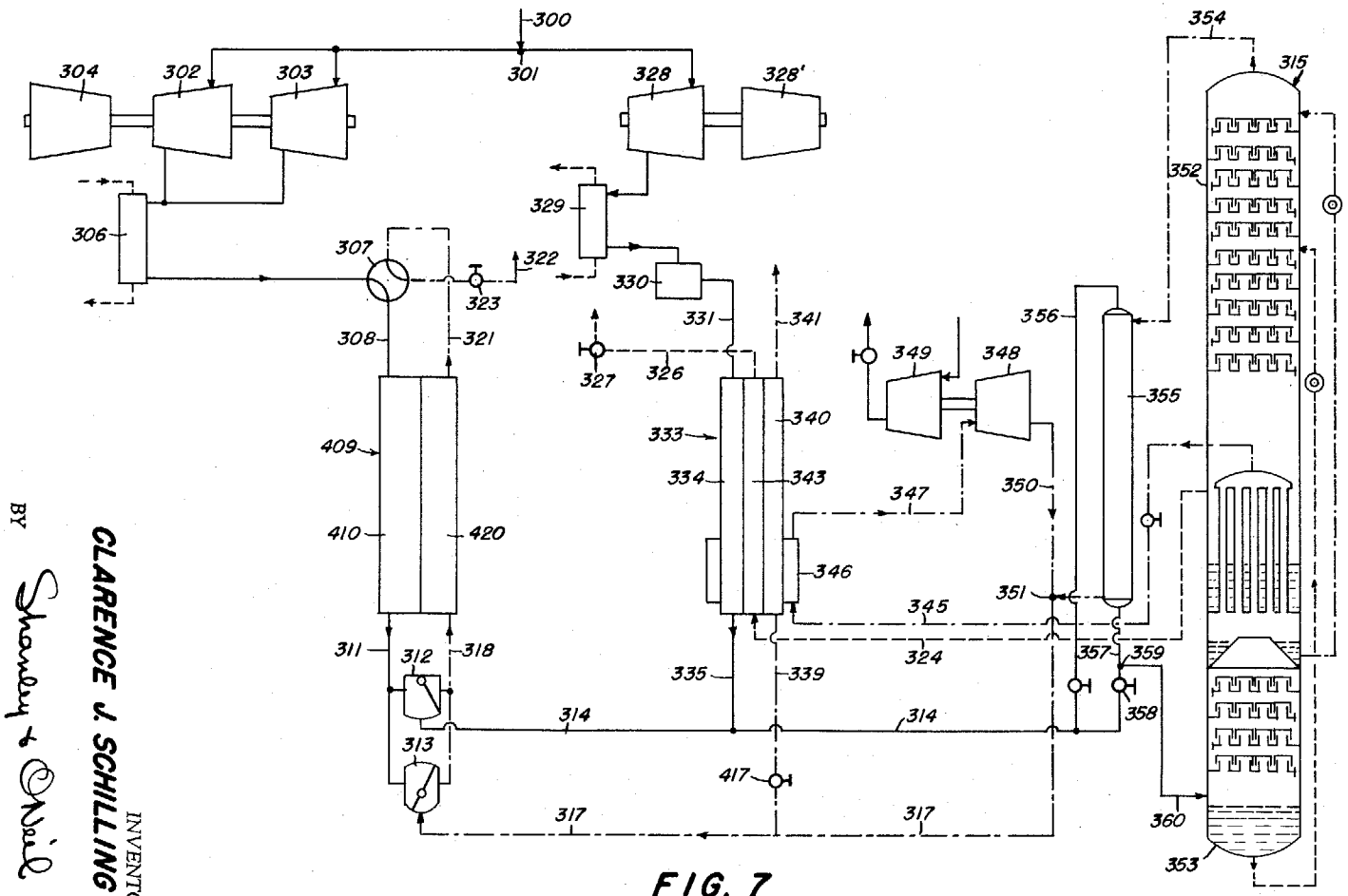
FIGURE 7 is a diagrammatic representation of an air fractionating cycle illustrating another variation of the present invention.

In FIGURE 7 of the drawings a further variation of the present invention is disclosed in which a major portion of the air feed is passed downwardly through one interchanger and nitrogen component gas only is passed upwardly through the heat exchanger in heat exchange relation with the major portion of the air feed. The cycle shown in FIGURE 7 is somewhat similar to the embodiment illustrated in FIGURE 4 and similar elements are identified by similar reference characters. In FIGURE 7, air which has been previously cleaned of dust, enters the system at 300 and at point 301 this air supply is divided with a major portion, for example, 67% of the air, being compressed in a pair of turbo-compressors 302 and 303. The air compressed to a suitable pressure, for example, about 100 lbs. per square inch absolute flows from the compressors through after-cooler 306 and then to a reversing valve 307. With the valve 307 in the position shown, compressed air flows through a conduit 308 to an interchanger 409 and flows down through interchanger passage 410, being cooled therein by heat exchange with cold nitrogen component gas returning from the fractionating column 315. The refrigerated air leaves the bottom of the interchanger through conduit 311, and the air under pressure biases the flap valves 312 and 313 so that the refrigerated air flows through valve 312 to conduit 314 and then to the two stage fractionating column 315.

With the reversing valve 307 in the position shown, cold and dry nitrogen component gas at a low pressure substantially the same as the low pressure maintained in the low pressure stage of the fractionating column flows from the conduit 317, through valve 313 and line 318 to the interchanger 409, upwardly through passage 420 and leaves the interchanger through conduit 321. The warmed nitrogen gas flows through conduit 321 to reversing valve 307, through conduit 322 and thence out of the system. As the air flows down through passage 410 congealable material, for example, carbon dioxide, is deposited in the passage. Periodically the reversing valve 307 is rotated through a quarter turn to switch the air and nitrogen passes so that air will flow downwardly through passage 420 and nitrogen gas will flow upwardly through passage 410. For reasons set out below, the upwardly flowing stream of nitrogen carries all previously congealed material, such as the carbon dioxide.

In order to reduce the temperature difference between the refrigerated air and the cold nitrogen component gas at the lower end of the interchanger, a larger mass of nitrogen component gas is passed upwardly through the interchanger 409 than the mass of air passing down through the interchanger. For example, the nitrogen component gas may comprise about 70% of the total component gases and may be passed upwardly through the interchanger to cool about 67% of the air. Nitrogen component gas comprising about 70% of the total component gases will be in sufficient quantity to establish a purging action at the efficient temperature difference with which the interchanger is designed to operate when approximately 67% of the air is passed in heat exchange relation therewith. With the relatively larger mass of component nitrogen gas flowing up through the interchanger, the nitrogen component gas will completely remove deposited congealable material, particularly the carbon dioxide.

A minor portion of the air to be fractionated in the system, for example, 33% of the air, is compressed by the turbo-compressor 328, and then cooled in the after-cooler 329. The cooled compressed air flows through a carbon dioxide-removing unit 330 in which the carbon dioxide is reduced to unobjectionable proportions by chemical means, for example. From the unit 330 the minor portion of air flows through conduit 331 to the interchanger 333 and down through interchanger passage 334 to the conduit 335. As the air flows through the interchanger 333, it is cooled by heat exchange with component gases flowing backwardly from the fractionating column. The refrigerated compressed air flows through the conduit 335 to conduit 314, where the minor portion of the refrigerated air is mixed with the major portion of refrigerated air from interchanger 409 before flowing to the fractionating column.

The portion of cooled low pressure nitrogen component gas which does not flow through the interchanger 409 is passed from the conduit 317 through control valve 417 and conduit 339 to interchanger 333. This portion of the nitrogen component gas flows through passage 340 in heat exchange relationship with the air stream flowing through passage 334 and leaves the upper end of the interchanger through conduit 341. The valve 417 controls the proportionment of low pressure nitrogen component gas between the interchangers 333 and 409.

Cold oxygen component gas flows continuously from the conduit 324 up through passage 343 of the interchanger 333, and the warmed oxygen gas leaves the interchanger passing to header 326 and out of the system through valve 327.

The passes 334 and 340 of the interchanger 333 may be connected to a switching valve 332 and to control valves 336 and 337 in a manner shown in FIGURE 4 if it is desired to alternately switch the flow of air and nitrogen component gas through these passageways of the interchanger.

About 30% of the component gases, comprising the total oxygen component gas and the portion of the nitrogen component gas which does not flow through the interchanger 409, flows up through the interchanger 333 in heat exchange with about 33% of the total amount of air. Thus, the mass of air cooled in interchanger 333 is larger than the mass of low pressure component gases flowing up through the interchanger. In order to cool the air in the interchanger 333 to about the same temperature that the air is cooled in interchanger 409, high pressure nitrogen gas withdrawn from the high pressure section of column 315 through conduit 345 is flowed through passageway 346 in heat exchange relationship with the air flowing through interchanger 333. The warmed high pressure nitrogen flows from the passageway 346 through conduit 347 to the expansion engine 348. The expanded nitrogen gas flows through conduit 350 and merges with the low pressure nitrogen component gas at point 351 and the amount of nitrogen component gas flowing through conduit 317 comprises the nitrogen component gas separated from the air.

The cycle shown in FIGURE 7 has the advantage of permitting the use of a two pass heat exchanger 409 for cooling a major portion of the air feed, and the cycle may be easily adapted for the use of a pair of switching regenerators in the place of the interchanger 409.

In each of the systems shown and described, the system is operated continuously and the air is refrigerated by being flowed through interchanger means in one direction and in heat exchange relationship with countercurrently flowing low pressure nitrogen component and low pressure oxygen component gases. The low pressure component gases are warmed by abstracting heat from the air. In addition, a stream of nitrogen gas is withdrawn from the high pressure stage of the two stage fractionating column and continuously passed through the heat interchange means in heat exchange relationship with a countercurrently flowing stream of air so that heat is simultaneously abstracted from this stream of air by the high pressure nitrogen stream and at least one stream of low pressure component gas. The warming of the high pressure nitrogen stream with its subsequent expansion and addition to the low pressure nitrogen component stream flowing from the low pressure stage of the fractionating column compensates for refrigeration losses in the system. In addition, the high pressure nitrogen stream flowing through the heat interchange means aids directly or indirectly in deriming the heat interchanger passage or passages through which air and nitrogen are alternately passed.

In each of the systems shown and described, the compressed air is refrigerated by heat interchange with the lower pressure oxygen and nitrogen gases and in carrying out this interchange, air is flowed along a path and cooled by flowing at least one of the cold, low pressure component gases in heat exchange effecting relationship throughout the length of this air path. The supplemental path of the high pressure nitrogen also is in heat exchange effecting relationship with at least a portion of this air path. In FIGURE 1, part of the air is flowed along this path which has at least a portion in heat exchange effecting relationship with the supplemental path. In FIGURE 3, for example, all of the air is flowed along the above-mentioned air path. The air path which has at least a portion in heat exchange effecting relationship with the supplemental path of the high pressure nitrogen may be in one or more sections. For example, if there is only one exchanger 221 in the system shown in FIGURE 3, then the air path is in one section, whereas, if the system includes a number of exchangers, then the air path is divided into the same number of parallel sections or paths. The term "path" includes a path which consists of one section or which consists of a number of similar sections or parallel lengths of paths.

This application is a continuation of applicant's copending application Serial No. 561,209 now abandoned which is a divisional application of application Serial No. 450,927 of August 19, 1954 which is now Patent No. 2,836,040. Application Serial No. 450,927 is a continuation of applicant's application Serial No. 231,221 of June 12, 1951, now abandoned, which was a continuation-in-part application of applicant's application Serial No. 755,286 of June 18, 1947, which is now United States Patent No. 2,626,510 of January 27, 1953.

What is claimed is:

1. The method of separating gaseous mixtures into components in which compressed gaseous mixture is refrigerated by heat interchange with cold component gas and supplied to a fractionating operation having a high pressure stage and a low pressure stage, comprising the steps of providing first and second streams of [substantially dry] compressed gaseous mixture containing high boiling point impurity, flowing the first stream of compressed gaseous mixture in one direction through a first path and flowing a first portion of cold component gas from the fractionating operation including a first stream of cold component gas in the opposite direction in heat exchange effecting relation with the first path during one period of the heat interchange to thereby cool the first stream of compressed gaseous mixture and congeal high boiling point impurity along the first path, flowing the first stream of cold component gas through the first path in the opposite direction in contact with the congealed impurity during a second period of the heat interchange, proportioning the relative mass of the first portion of cold component gas and the first stream of compressed gaseous mixture so that the first [steam] *stream* of cold component gas substantially completely sweeps out the congealed impurity during the second period of the heat interchange, passing the second stream of compressed gaseous mixture in one direction through a second path and flowing a second portion of cold component gas from the fractionating operation in the opposite direction in heat exchange effecting relation with the second path to thereby cool the second stream of compressed gaseous mixture, removing higher boiling point impurity from the second stream of compressed gaseous mixture without the second path, withdrawing a stream of cold gas under relatively high pressure from the fractionating operation, passing the withdrawn stream in heat exchange effecting relation with at least a portion of the second path to cool the second stream of compressed gaseous mixture to about the temperature of the first stream of gaseous mixture leaving the first path and thereby warm the withdrawn stream, expanding the warm stream, adding the effluent of the expansion step to cold component gas from the fractionating operation, and feeding the first and second streams of cool compressed gaseous mixture to the fractionating operation.

2. The method of separating gaseous mixtures as defined in claim 1 in which a stream of fluid is withdrawn from the first path during the second period at a temperature above the solidification temperature of the high boiling point inpurity and is passed in heat exchange effecting relation with the second path adjacent its warm end.

3. The method of separating gaseous mixtures as defined in claim 1 in which a part of the second portion of compressed gaseous mixture is passed in heat exchange effecting relation with the first path and then introduced into the second portion of gaseous mixture in the second path.

4. The method of separating air into oxygen and nitrogen cold component gas in which compressed air is refrigerated by heat interchange with cold component gas and supplied to a fractionating operating, comprising the steps of providing first and second portions of compressed air containing high boiling point carbon dioxide impurity, flowing the first portion of compressed air in one direction through a first path and flowing a first portion of cold component gas from the fractionating operation including a first stream of cold nitrogen component gas in the opposite direction in heat exchange effecting relation with the first path during one period of the heat interchange to thereby cool the first portion of compressed air and congeal high boiling point carbon dioxide impurity along the first path, flowing the first stream of cold nitrogen component gas through the first path in the opposite direction in contact with congealed high boiling point carbon dioxide impurity during a second period of the heat interchange, proportioning the relative mass of the first portion of component gas and the first portion of compressed air so that the first stream of cold nitrogen component gas substantially completely sweeps out congealed high boiling point carbon dioxide impurity during the second period of the heat interchange, passing the second portion of compressed air in one direction through a second path and flowing a second portion of cold component gas in the opposite direction in heat exchange effecting relation with the second path to thereby cool the second portion of compressed air, removing high boiling point carbon dioxide impurity from the second portion of compressed air without the second path, withdrawing a stream of cold fluid under relatively high pressure from the fractionating operation, passing the withdrawn stream in heat exchange effecting relation with at least a portion of the second path to cool the second portion of compressed air to about the temperature of the first portion of compressed air leaving the first path and thereby warm the withdrawn stream, expanding the warm stream and adding the effluent of the expansion step to cold component gas from the fractionating operation, and feeding the first and second portions of cold compressed air to the fractionating operation.

5. The method defined in claim 4 in which the second portion of compressed air passed to the second path contains moisture and in which the second portion of cold component gas and the second portion of compressed air are alternately passed through the second path.

6. The method of separating air into oxygen and nitrogen component gas in which compressed air is refrigerated by heat interchange with cold component gas and supplied to a fractionating operation having a high pressure stage and a low pressure stage, comprising the steps of providing major and minor portions of compressed air containing high boiling point carbon dioxide impurity, flowing the major portion of compressed air in one direction through a first path and flowing a first portion of cold component gas from the fractionating operation including a first stream of cold nitrogen component gas in the opposite direction in heat exchange effecting relation with the first path during one period of the heat interchange to thereby cool the major portion of compressed air and congeal high boiling point carbon dioxide impurity along the first path, flowing the first stream of cold nitrogen component gas through the first path in the opposite direction in contact with congealed high boiling point carbon dioxide impurity during a second period of the heat interchange, proportioning the relative mass of the first portion of component gas and the major portion of compressed air so that the stream of cold nitrogen component gas substantially completely sweeps out congealed high boiling point carbon dioxide impurity during the second period of the heat interchange, passing the minor portion of compressed air in one direction through a second path and flowing a second portion of cold component gas including nitrogen component gas and oxygen component gas in the opposite direction in heat exchange effecting relation with the second path to thereby cool the minor portion of the compressed air, removing high boiling point carbon dioxide impurity from the minor portion of compressed gas without the second path, withdrawing a stream of cold nitrogen gas from the high pressure stage of the fractionating operation, passing the withdrawn stream in heat exchange effecting relation with at least a portion of the second path to cool the minor portion of the compressed air to about the temperature of the major portion of compressed air leaving the first path and thereby warm the withdrawn stream, expanding the warm stream and adding the effluent of the expansion step to cold nitrogen component gas from the fractionating operation, and feeding the major and minor portions of cold compressed air to the fractionating operation.

*7. The method of separating gaseous mixtures into components in which compressed gaseous mixture is refrigerated by heat interchange with cold component gas and supplied to a fractionating operation, comprising the steps of providing first and second streams of compressed gaseous mixture containing high boiling point impurity, flowing the first stream of compressed gaseous mixture in one direction through a first path and flowing a first portion of cold component gas from the fractionating operation including a first stream of cold component gas in the opposite direction in heat exchange effecting relation with the first path during one period of the heat interchange to thereby cool the first stream of compressed gaseous mixture and congeal high boiling point impurity along the first path, flowing the first stream of cold component gas through the first path in the opposite direction in contact with the congealed impurity during a second period of the heat interchange, proportioning the relative mass of the first portion of cold component gas and the first stream of compressed gaseous mixture so that the first stream of cold component gas substantially completely sweeps out the congealed impurity during the second period of the heat interchange, passing the second stream of compressed gaseous mixture in one direction through a second path and flowing a second portion of cold component gas from the fractionating operation in the opposite direction in heat exchange effecting relation with the second path to thereby cool the second stream of compressed gaseous mixture, removing higher boiling point impurity from the second stream of compressed gaseous mixture without the second path, withdrawing a stream of cold gas under relatively high pressure from the fractionating operation, passing the withdrawn stream in heat exchange effecting relation with at least a portion of the second path to cool the second stream of compressed gaseous mixture to about the temperature of the first stream of gaseous mixture leaving the first path and thereby warm the withdrawn stream, expanding the warm stream, adding effluent of the expansion step to cold gas produced by the fractionating operation, and feeding the first and second streams of cool compressed gaseous mixture to the fractionating operation.*

*8. The method of separating air into oxygen and nitrogen cold component gas in which compressed air is refrigerated by heat interchange with cold component gas and supplied to a fractionating operation, comprising the steps of providing first and second portions of compressed air containing high boiling point carbon dioxide impurity,*

*flowing the first portion of compressed air in one direction through a first path and flowing a first portion of cold component gas from the fractionating operation including a first stream of cold nitrogen component gas in the opposite direction in heat exchange effecting relation with the first path during one period of the heat interchange to thereby cool the first portion of compressed air and congeal high boiling point carbon dioxide impurity along the first path, flowing the first stream of cold nitrogen component gas through the first path in the opposite direction in contact with congealed high boiling point carbon dioxide impurity during a second period of the heat interchange, proportioning the relative mass of the first portion of component gas and the first portion of compressed air so that the first stream of cold nitrogen component gas substantially completely sweeps out congealed high boiling point carbon dioxide impurity during the second period of the heat interchange, passing the second portion of compressed air in one direction through a second path and flowing a second portion of cold component gas in the opposite direction in heat exchange effecting relation with the second path to thereby cool the second portion of compressed air, removing high boiling point carbon dioxide impurity from the second portion of compressed air without the second path, withdrawing a stream of cold fluid under relatively high pressure from the fractionating operation, passing the withdrawn stream in heat exchange effecting relation with at least a portion of the second path to cool the second portion of compressed air to about the temperature of the first portion of compressed air leaving the first path and thereby warm the withdrawn stream, expanding the warm stream and adding effluent of the expansion step to cold gas produced by the fractionating operation, and feeding the first and second portions of cold compressed air to the fractionating operation.*

*9. The method of separating air into oxygen and nitrogen component gas in which compressed air is refrigerated by heat interchange with cold component gas and supplied to a fractionating operation having a high pressure stage and a low pressure stage, comprising the steps of providing major and minor portions of compressed air containing high boiling point carbon dioxide impurity, flowing the major portion of compressed air in one direction through a first path and flowing a first portion of cold component gas from the fractionating operation including a first stream of cold nitrogen component gas in the opposite direction in heat exchange effecting relation with the first path during one period of the heat interchange to thereby cool the major portion of compressed air and congeal high boiling point carbon dioxide impurity along the first path, flowing the first stream of cold nitrogen component gas through the first path in the opposite direction in contact with congealed high boiling point carbon dioxide impurity during a second period of the heat interchange, proportioning the relative mass of the first portion of component gas and the major portion of compressed air so that the stream of cold nitrogen component gas substantially completely sweeps out congealed high boiling point carbon dioxide impurity during the second period of the heat interchange, passing the minor portion of compressed air in one direction through a second path and flowing a second portion of cold component gas including nitrogen component gas and oxygen component gas in the opposite direction in heat exchange effecting relation with the second path to thereby cool the minor portion of the compressed air, removing high boiling point carbon dioxide impurity from the minor portion of compressed gas without the second path, withdrawing a stream of cold fluid from the high pressure stage of the fractionating operation, passing the withdrawn stream in heat exchange effecting relation with at least a portion of the second path to cool the minor portion of the compressed air to about the temperature of the major portion of compressed air leaving the first path and thereby warm the withdrawn stream, expanding the warm stream and adding effluent of the expansion step to cold gas produced by the fractionating operation, and feeding the major and minor portions of cold compressed air to the fractionating operation.*

*10. The method of separating gaseous mixtures into components in a system in which compressed gaseous mixture is refrigerated by heat interchange with cold component gas and supplied to a fractionating operation of the system, comprising the steps of providing first and second portions of compressed gaseous mixture containing high boiling point impurity, flowing the first portion of compressed gaseous mixture in one direction through a first path and flowing a first portion of cold component gas from the fractionating operation including a first stream of cold component gas in the opposite direction in heat exchange effecting relation with the first path during one period of the heat interchange to thereby cool the first portion of compressed gaseous mixture and congeal high boiling point impurity along the first path, flowing the first stream of cold component gas through the first path in the opposite direction in contact with the congealed impurity during a second period of the heat interchange, proportioning the relative mass to the first portion of the cold component gas and the first portion of compressed gaseous mixture so that the first stream of cold component gas substantially completely sweeps out the congealed impurity during the second period of the heat interchange, passing compressed gas including the second portion of compressed gaseous mixture to a heat exchange zone, passing a second portion of cold component gas from the fractionating operation through the heat exchange zone in countercurrent heat exchange effecting relation with the second portion of compressed gaseous mixture and withdrawing cooled compressed gaseous mixture of the second portion from the heat exchange zone, the second portion of cold component gas comprising a stream of component gas under relatively low pressure and a stream of compressed gas including component gas under relatively high pressure, removing high boiling point impurity from the second portion of compressed gaseous mixture without the heat exchange zone, withdrawing a stream of compressed gas from the heat exchange zone after passing through a portion of the heat exchange zone so that the stream of compressed gas so withdrawn from the heat exchange zone is at a temperature warmer than the temperature of the cooled compressed gaseous mixture of the second portion withdrawn from the heat exchange zone, expanding the stream of withdrawn compressed gas with the production of external work, adding effluent of the expansion step to cold gas of the fractionating operation to compensate for refrigeration losses in the system, and feeding the first portion of cooled compressed gaseous mixture and cooled second portion of compressed gaseous mixture to the fractionating operation.*

References Cited in the file of this patent or the original patent

UNITED STATES PATENTS

| | | |
|---|---|---|
| 2,105,214 | De Baufre | Jan. 11, 1938 |
| 2,504,051 | Scheibel | Apr. 11, 1950 |
| 2,579,498 | Jenny | Dec. 25, 1951 |
| 2,626,510 | Schilling | Jan. 27, 1953 |
| 2,673,456 | Scharmann | Mar. 30, 1954 |

FOREIGN PATENTS

| | | |
|---|---|---|
| 276,292 | Great Britain | Aug. 18, 1927 |